United States Patent [19]

Yamanaka

[11] Patent Number: 4,701,786
[45] Date of Patent: Oct. 20, 1987

[54] PEDESTAL CONTROL CIRCUIT

[75] Inventor: Junichi Yamanaka, Sagamihara, Japan

[73] Assignee: Kabushiki Kaisha Toshiba, Kawasaki, Japan

[21] Appl. No.: 839,566

[22] Filed: Mar. 14, 1986

[30] Foreign Application Priority Data

Mar. 30, 1985 [JP] Japan ............................. 60-47696[U]

[51] Int. Cl.⁴ ......................... H04N 9/69; H04N 9/72
[52] U.S. Cl. ....................................... 358/32; 358/34; 358/164
[58] Field of Search ................... 358/32, 34, 164, 171, 358/172

[56] References Cited

U.S. PATENT DOCUMENTS

| | | | |
|---|---|---|---|
| 3,651,248 | 3/1972 | Schneider | 358/34 |
| 3,845,326 | 10/1974 | Godden | 358/172 |
| 4,038,685 | 7/1977 | Bazin | 358/32 |
| 4,202,009 | 5/1980 | Ushiyama et al. | 358/32 |
| 4,249,208 | 2/1981 | Haenen et al. | 358/171 |
| 4,473,839 | 9/1984 | Noda | 358/21 R |
| 4,506,287 | 3/1985 | Yamanaka et al. | 358/21 R |

FOREIGN PATENT DOCUMENTS

| | | | |
|---|---|---|---|
| 1131264 | 6/1962 | Fed. Rep. of Germany | 358/171 |
| 50-38451 | 12/1975 | Japan | |
| 10076 | 1/1984 | Japan | 358/164 |

Primary Examiner—John W. Shepperd
Attorney, Agent, or Firm—Oblon, Fisher, Spivak, McClelland, & Maier

[57] ABSTRACT

In a pedestal control circuit, a reference signal is superposed on a video signal before gamma correction. The reference signal component is detected from the gamma-corrected video signal. The level of the detected reference signal component is compared with the level of a pedestal control signal. The level of the reference signal to be superposed on the video signal is controlled in accordance with the comparison result so that the pedestal level of the gamma-corrected video signal is constant.

11 Claims, 24 Drawing Figures

F I G. 4
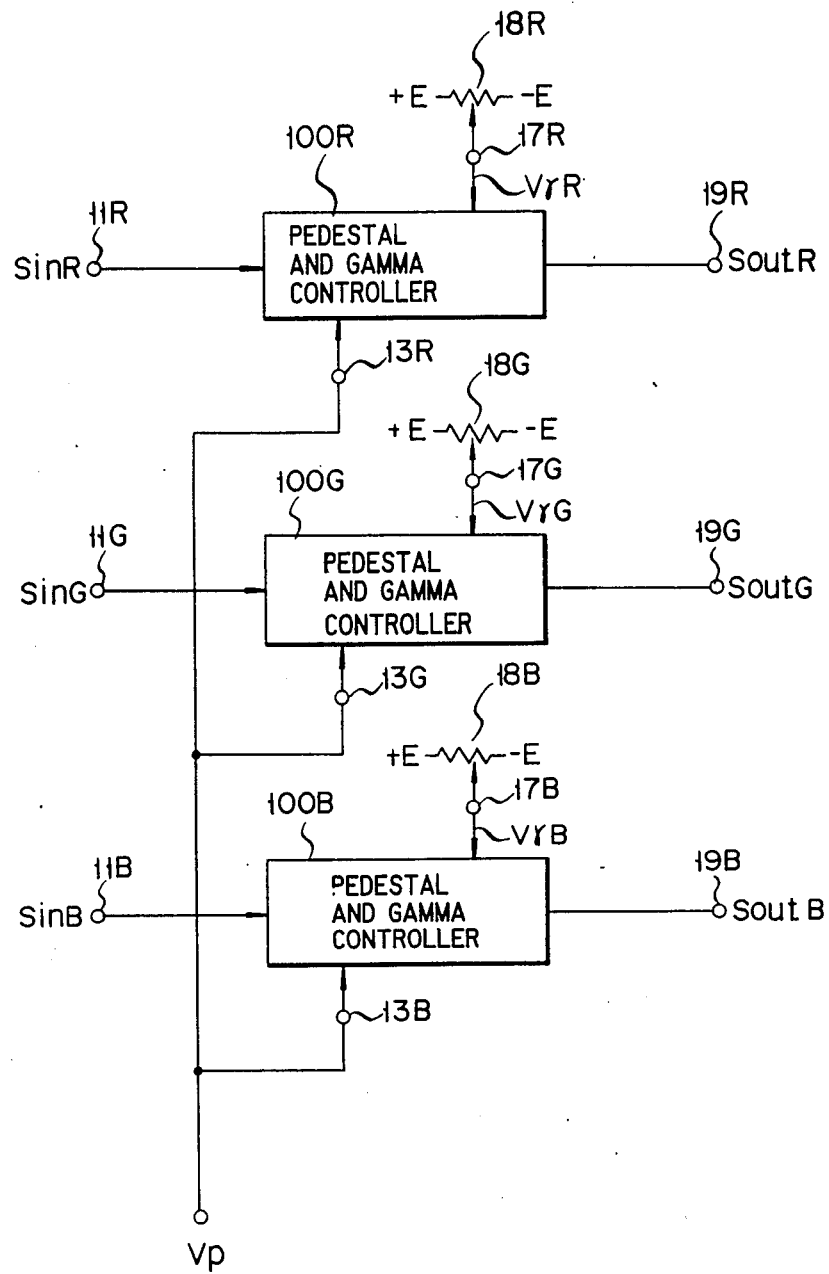

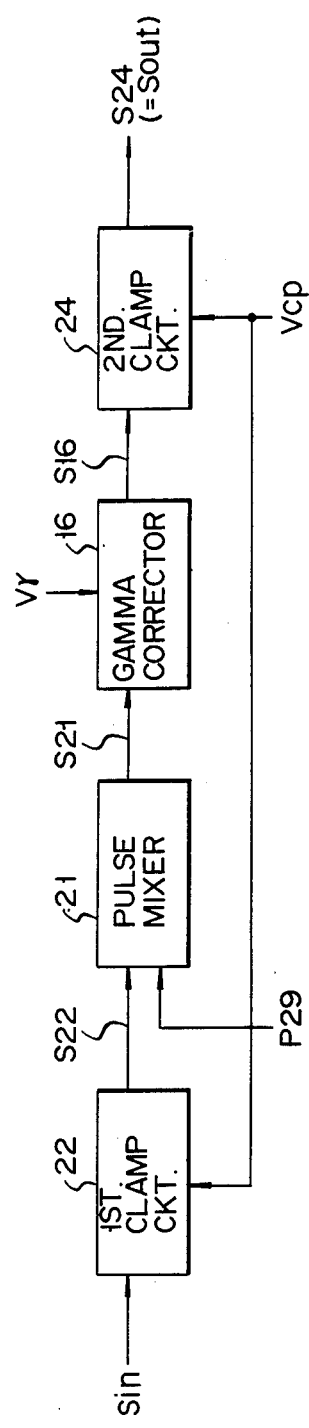
F I G. 5
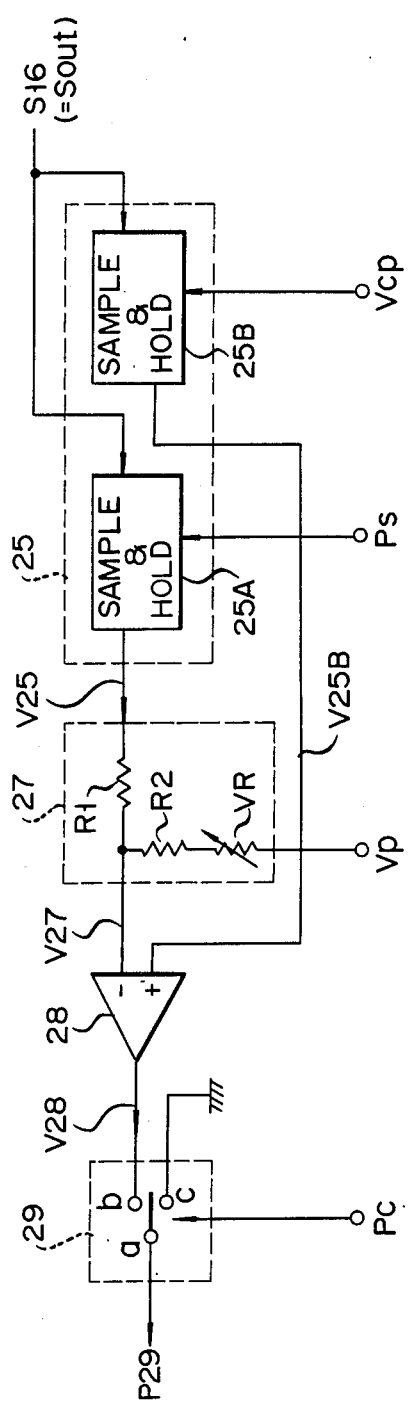
F I G. 6

F I G. 7
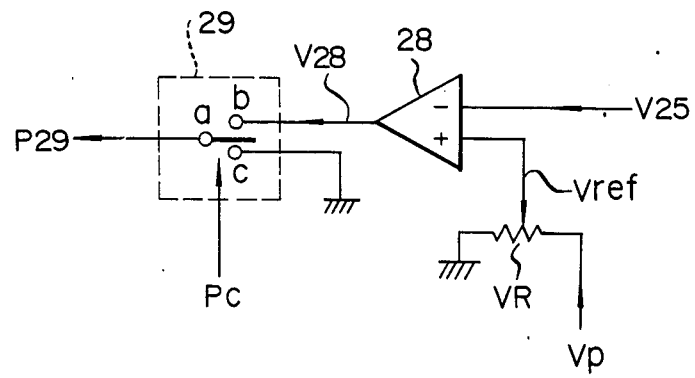
F I G. 8
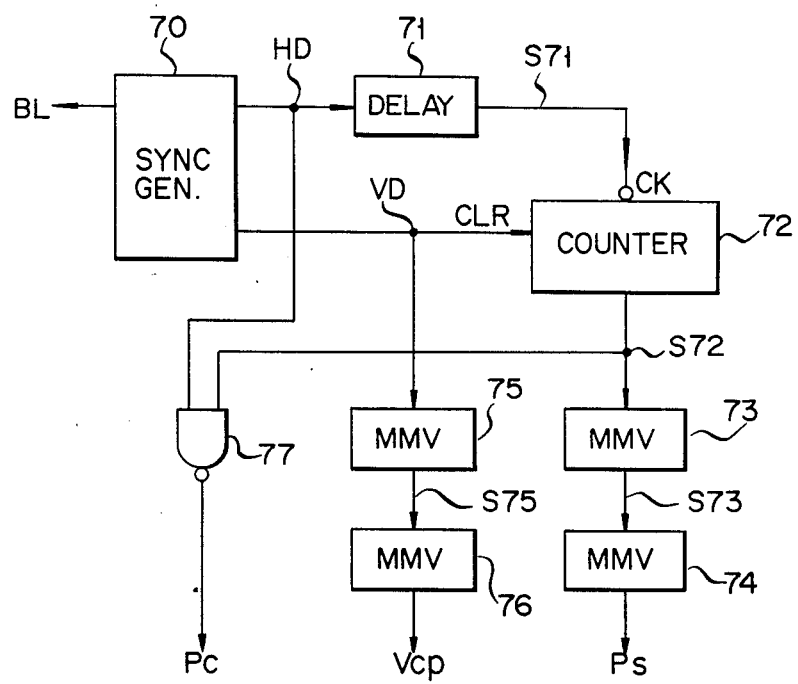

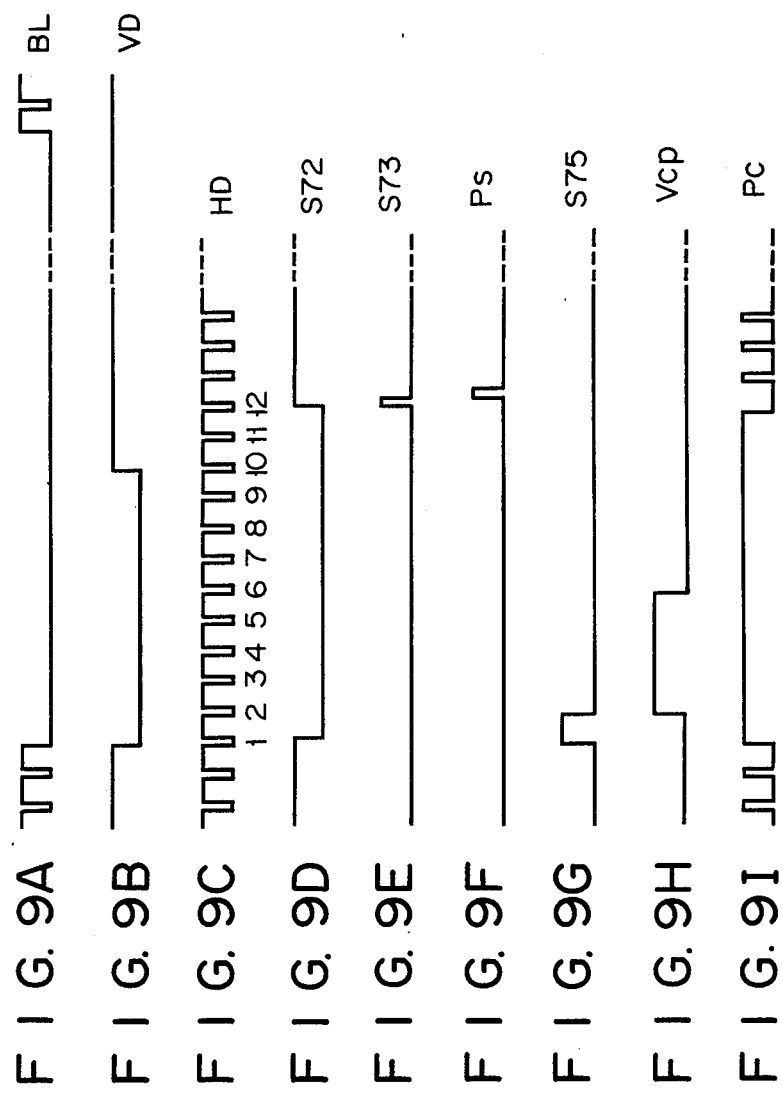

PEDESTAL CONTROL CIRCUIT

BACKGROUND OF THE INVENTION

The present invention relates to a pedestal control circuit used in a broadcasting color TV camera or the like and, more particularly, a pedestal control circuit wherein the pedestal level of the gamma-corrected video signal does not change even if the gamma correction characteristic is changed for color adjustment.

In high-quality color TV monitors for broadcasting or the like, pedestal control (pedestal correction) and gamma correction are performed as important functions of color adjustment for optimal color reproduction and contrast. Pedestal control is performed so as to obtain an optimal black level of color signals and to match the black levels of the red, green and blue color signals. Gamma correction is performed so as to achieve correct color reproduction within a full range of luminance information from black to white by compensating nonlinearity of the brightness vs. cathode current characteristic of a CRT using a complementary inverted characteristic.

In a conventional circuit configuration, pedestal correction (or DC restoration) is followed by gamma correction. However, with this circuit configuration, the pedestal level fluctuates each time the gamma correction characteristic is changed. For example, referring to FIG. 3, when video signal S22A is an input signal to a gamma corrector to be gamma-corrected, the gamma corrector produces signal S16A as gamma-corrected output in accordance with gamma correction characteristic curve A. When gamma correction curve A is changed to B, a gamma-corrected output for input S22A becomes signal S16X. As can be seen from a comparison of pedestal level eplA of signal S16A and pedestal level eplX of signal S16X, in the conventional circuit configuration, a change in gamma correction characteristic (e.g., curve A to B) results in fluctuation (eplA to eplX) in pedestal level of the gamma-corrected output (S16). For this reason, the pedestal level of the gamma-corrected output must be re-adjusted each time gamma correction adjustment is performed. If this re-adjustment is not performed, correct black level reproduction cannot be performed.

The above is a problem encountered in gamma correction in conventional pedestal control circuits.

When the pedestal levels of red (R), green (G) and blue (B) are controlled by a single pedestal control voltage, the pedestal levels of the R, G and B color signals vary unless the gamma correction characteristics of the respective color signals completely coincide with each other. When the pedestal levels of the R, G and B color signals vary, correct black level reproduction cannot be performed. Assume that the R signal gamma correction curve is curve A in FIG. 3 and the G and B signal gamma correction curves are curve B in FIG. 3. Under this assumption, when pedestal correction of the G and B color signals is performed, the pedestal level of the R color signal is deviated from the optimal value. In order to solve this problem, instead of adjustment by a single pedestal control voltage, pedestal correction adjustment must be independently performed for each of the R, G and B color signals. However, this results in a complex adjustment process in the actual manufacture and causes variations in the pedestal correction adjustment.

The above problem is presented when pedestal correction of two or more color signals is performed with a conventional pedestal control circuit.

SUMMARY OF THE INVENTION

It is a first object of the present invention to provide a pedestal control circuit which can prevent variations in pedestal level of a gamma-corrected signal upon a change in gamma correction characteristic.

It is a second object of the present invention to provide a pedestal control circuit in which pedestal levels of pedestal-corrected signals do not vary from one another even if a single pedestal control voltage is used to perform pedestal correction of two or more signals.

In order to perform the first object, a pedestal control circuit of the present invention performs the following operation. First, a reference signal is superposed on an input signal to be gamma-corrected. The resultant signal is then gamma-corrected. The reference signal component is detected from the gamma-corrected signal. The level (potential) of the detected reference signal component is compared with a predetermined pedestal control voltage (potential). Based on the obtained comparison result (potential difference), the level (amplitude) of the reference signal is controlled such that the pedestal level of the gamma-corrected signal converges to a value corresponding to a pedestal control voltage.

In order to achieve the second object of the present invention, the pedestal control circuit which achieves the first object is independently arranged for each of pedestal controllers for respective color signals. These pedestal controllers are controlled by a single pedestal control voltage (or a signal which changes in correspondence with this voltage). Thus, pedestal correction for the respective input signals is performed simultaneously by a single pedestal control voltage.

BRIEF DESCRIPTION OF THE DRAWINGS

FIG. 4 is a block diagram showing an embodiment wherein the circuit configuration shown in FIG. 1 is applied to respective color signal circuits of red (R), green (G) and blue (B), and the circuits for R, G and B, each corresponding to that shown in FIG. 1, are controlled by single pedestal control voltage Vp;

FIG. 5 shows a partial modification of the circuit shown in FIG. 1, in which first clamp circuit 22 is arranged in an input circuit of pulse mixer 21;

FIG. 6 shows another partial modification of the circuit shown in FIG. 1, in which two sample/hold circuits 25A and 25B are used, and reference signal P29, corresponding to the potential difference between outputs V25 and V25B from the two S/H circuits, is used for pedestal level control;

FIG. 7 shows still another modification of the circuit shown in FIG. 1, in which reference signal P29, corresponding to the pontential difference between output V25 from S/H circuit 25 and pedestal control voltage Vp, is used for pedestal level control;

FIG. 8 is a block diagram showing a circuit for generating material signals Pc, Vcp and Ps used in the circuit shown in FIG. 1; and FIGS. 9A to 9I are timing charts explaining the circuit configuration shown in FIG. 8.

DETAILED DESCRIPTION OF THE PREFERRED EMBODIMENTS

Figure 1:
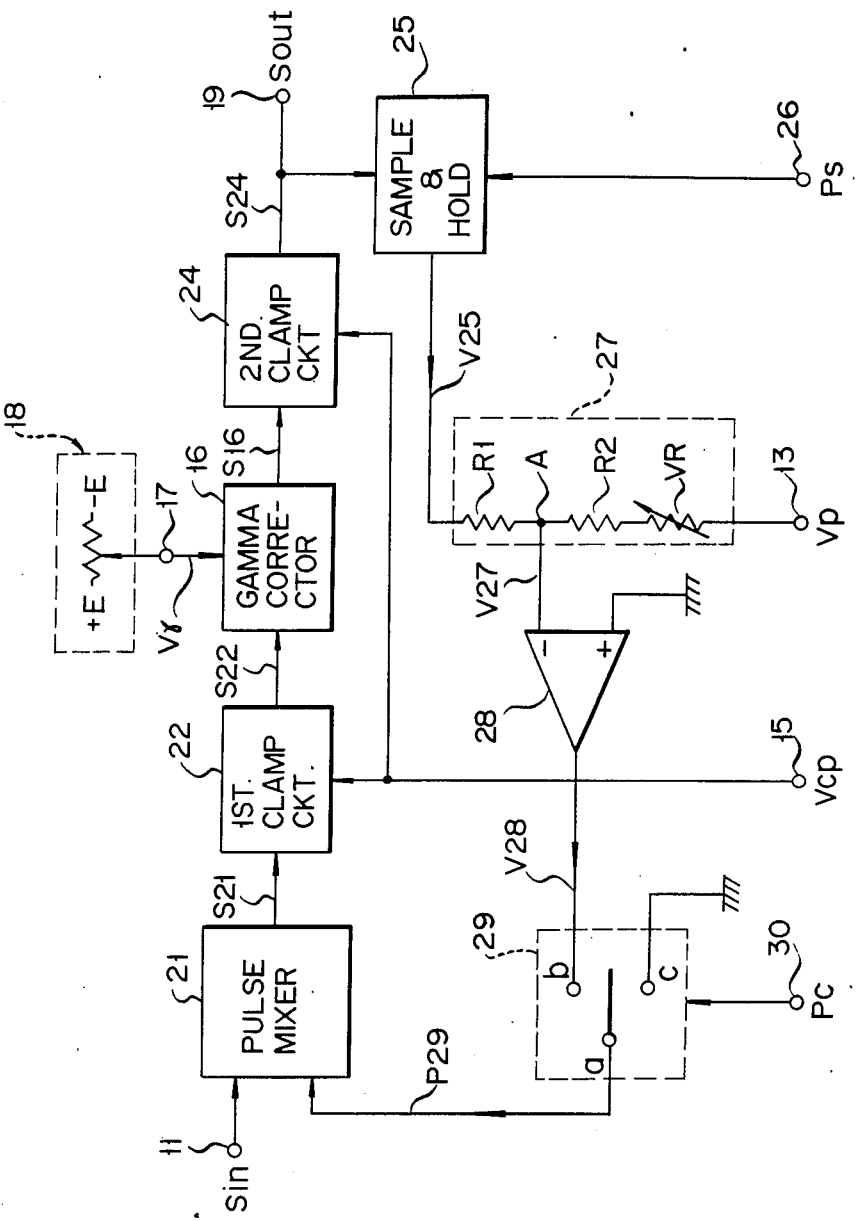
FIG. 1 is a block diagram showing a pedestal control circuit according to an embodiment of the present invention.

The preferred embodiments of the present invention will now be described in detail with reference to FIGS. 1 to 9. The same reference numerals throughout the drawings denote the same or similar parts, and they will not be repeatedly described.

FIG. 1 shows a pedestal control circuit used for one color signal among three color signals of red, green and blue. (Non-gamma-corrected) video signal Sin is received at input terminal 11 and supplied to pulse mixer 21. Mixer 21 also receives pedestal pulse P29 to be described later. Mixer 21 produces signal S21 in which pulse P29 is superposed on signal Sin. Signal S21 is supplied to first clamp circuit 22. Circuit 22 also receives control voltage Vcp through terminal 15. While voltage Vcp is received, circuit 22 clamps the bottom potential of signal S21 at 0 V. In other words, DC restoration for signal S21 is performed by circuit 22. DC-restored signal S22 from circuit 22 is supplied to gamma corrector 16.

Gamma corrector 16 also receives, from control voltage generator 18, control voltage Vγ for adjusting or changing the gamma correction characteristic. Corrector 16 has a gamma correction characteristic corresponding to voltage Vγ, as indicated by curve A or B in FIG. 3, and modifies or compensates non-linearly the potential change of input signal S22 in accordance with this characteristic.

In the circuit shown in FIG. 1, since control voltage Vγ is extracted through a variable resistor, Vγ can continuously change. Alternatively, voltage Vγ can have a potential which changes stepwise. When the output potential (analog) from the variable resistor in generator 18 is A/D converted, digital control data corresponding to control voltage Vγ is obtained. When gamma corrector 16 comprises a digital circuit using such digital data, gamma correction can be digitally controlled.

Gamma-corrected signal S16 from corrector 16 is supplied to second clamp circuit 24. Circuit 24 performs DC restoration of signal S16 as in circuit 22. Thus, the bottom potential of signal S16 is clamped at 0 V during the input period of control voltage Vcp. Resultant signal S24 is supplied, as gamma-corrected video signal Sout, to a color adjustment circuit, etc. (not shown) through output terminal 19.

Signal S24 from circuit 24 is also supplied to sample and hold circuit (to be referred to as S/H circuit hereinafter) 25. S/H circuit 25 also receives sampling pulse Ps through terminal 26. Circuit 25 samples and holds the potential of signal S24 in ON duration of pulse Ps. A signal circuit, which leads potential V25 held by circuit 25, is coupled to terminal 13 through a series circuit of resistors R1, R2 and VR. Terminal 13 receives pedestal control voltage Vp. Node A between resistors R1 and R2 is connected to one input terminal (inverting input) of operational amplifier 28. Potential V27 of node A corresponds to a sum of the potential (e.g., negative) of voltage Vp and potential V25 (e.g., positive). Thus, potential V25 can be arbitrarily adjusted by variable resistor VR. The other input terminal (non-inverting input) of amplifier 28 is circuit-grounded.

Amplifier 28 amplifies potential V27 and supplies output signal V28 to input terminal b of electronic switch circuit 29. Input terminal c of circuit 29 is circuit-grounded. Circuit 29 receives switching pulse Pc through terminal 30. When pulse Pc has low potential or low logic level L, output terminal a of circuit 29 is connected to terminal b. When pulse Pc has high potential or high logic level H, terminal a is connected to terminal c. As a result, terminal a produces pedestal pulse P29 which has the potential of signal V28 when Pc=L and the circuit ground potential when Pc=H. Pulse P29 is fed back to pulse mixer 21. Thus, a negative feedback loop (21→22→16→24→25→27→28→29→21), which renders node A as imaginary ground, is formed.

Incidentally, circuit components in the respective blocks of the circuit in FIG. 1 can be conventional components.

The basic circuit operation of the pedestal control circuit shown in FIG. 1 will be as follows. Reference signal P29 is superposed on video signal Sin to be gamma-corrcted. Potential V25 corresponding to reference signal P29 is extracted or detected from gamma-corrected video signal S24 (Sout). Potential V25 is compared with the potential of pedestal control voltage Vp. The potential (amplitude) of reference signal P29 is controlled so that the difference (V25−Vp) becomes constant.

The mode of operation of the pedestal control circuit shown in FIG. 1 will be described with reference to FIGS. 2A to 2H.

Figure 2A:
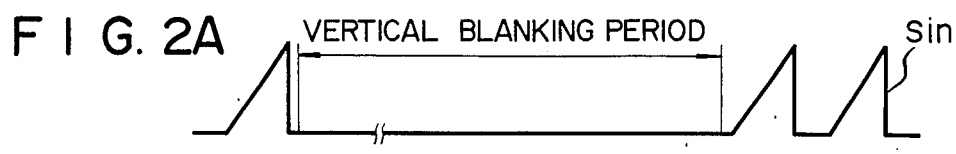
FIGS. 2A to 2H are waveform diagrams explaining the operation of the circuit shown in FIG. 1.
Figure 2B:
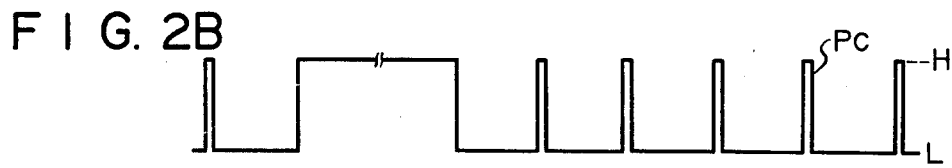
Figure 2C:
Figure 2D:
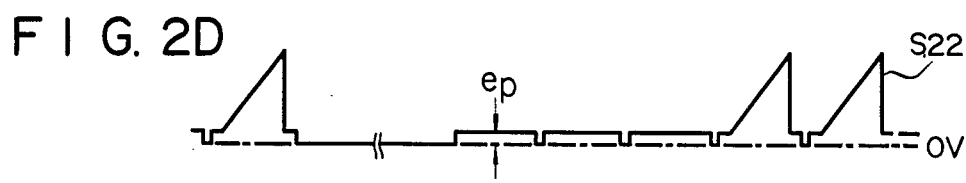
Figure 2E:
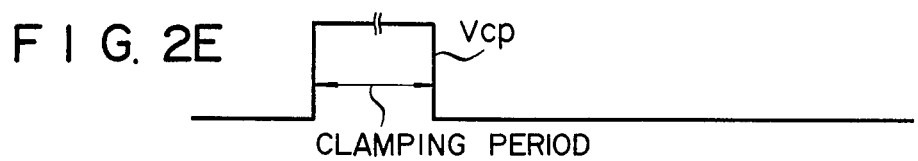

When signal Sin as shown in FIG. 2A is supplied to input terminal 11, pulse mixer 21 produces signal S21 in which pedestal pulse (reference signal) P29 as shown in FIG. 2C is superposed on signal Sin. Signal S21 is supplied to first clamp circuit 22. Circuit 22 also receives control voltage Vcp as shown in FIG. 2E in the vertical blanking period (FIG. 2A). The bottom potential of signal S21 received during input duration of voltage Vcp is clamped at a predetermined level, e.g., at 0 V. Then, video signal S22 having pedestal level ep as shown in FIG. 2D is produced by circuit 22.

Figure 2F:
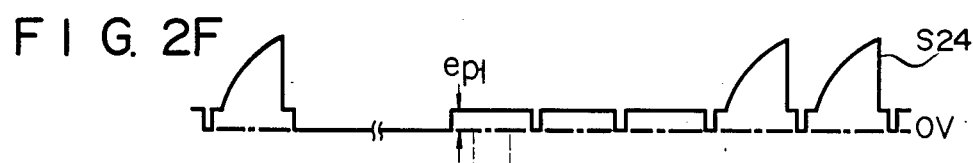
Figure 2G:
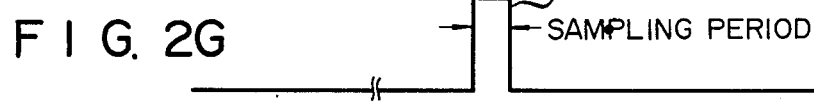
Figure 2H:
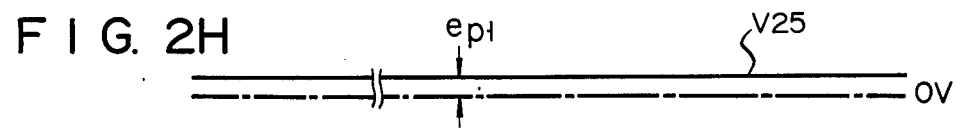
Figure 3:
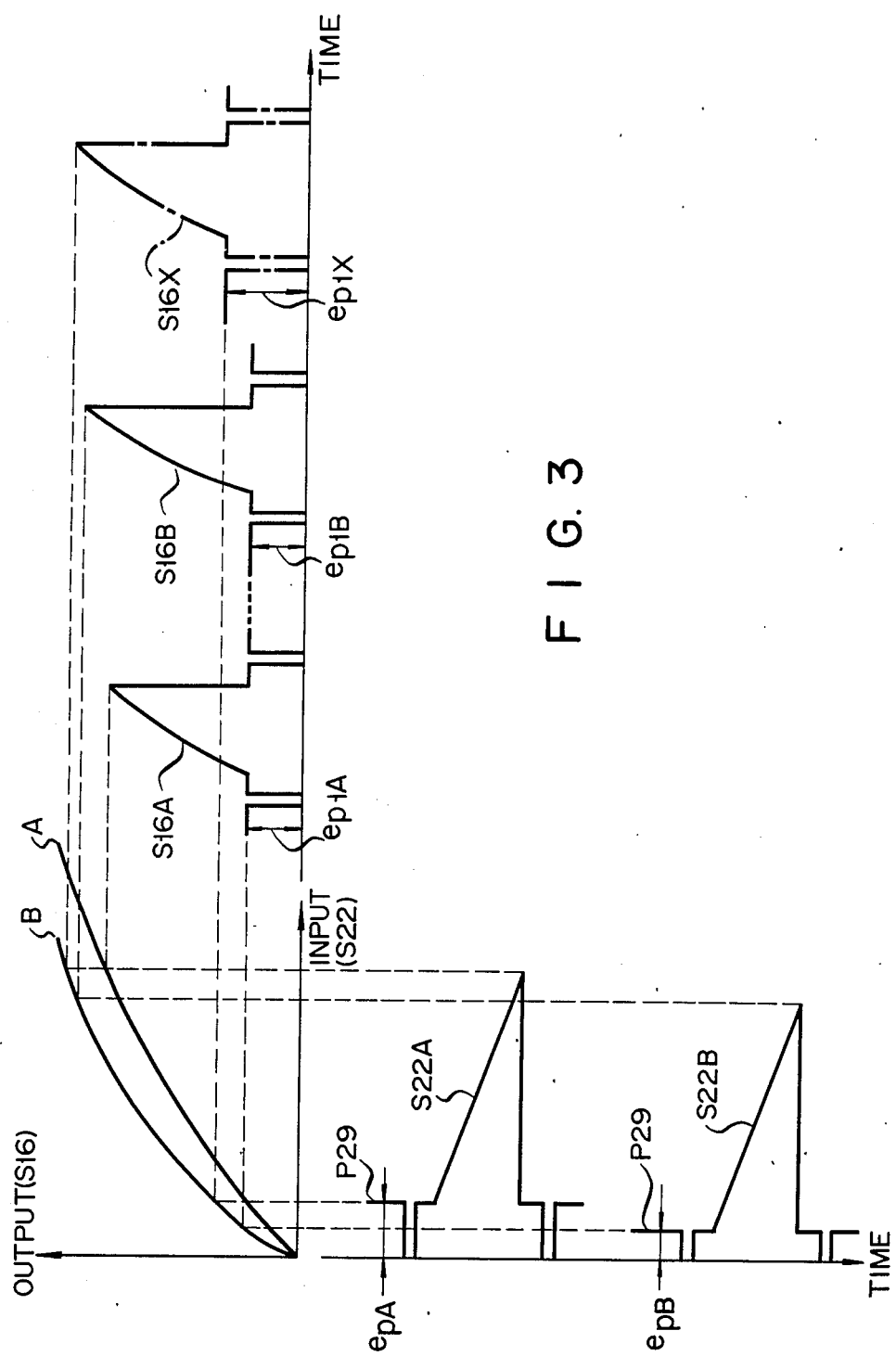
FIG. 3 is a waveform diagram explaining the process of pedestal level control by the circuit shown in FIG. 1.

Signal S22 is gamma-corrected by gamma corrector 16 which has a gamma correction characteristic represented by curve A or B in FIG. 3. The bottom potential of gamma-corrected output signal S16 from corrector 16 is clamped again at 0 V by second clamp circuit 24 during the ON duration of voltage Vcp (FIG. 2E). Circuit 24 produces gamma-corrected video signal S24 (=Sout) having pedestal level epl (FIG. 2F).

A case is considered wherein the feedback loop shown in FIG. 1 is not operated. In this case, the pedestal level of signal S24 changes to epl from that (ep) of signal S22 (FIGS. 2D and 2F). In order to suppress this pedestal level change (ep to epl), pedestal level epl is detected first.

Pedestal level epl is detected (or extracted) by S/H circuit 25 using sampling pulse Ps (FIG. 2G) which is generated immediately after the clamping period (FIG. 2E). Then, circuit 25 produces potential V25 (FIG. 2H) corresponding to (or equal to) only pedestal level epl of signal S24. Potential V25 (positive) is superposed onto pedestal control voltage Vp (negative) by pedestal adjustment circuit 27. When potential V27 at node A becomes positive, even slightly, upon such superposition, the DC level (potential) of output signal 128 from amplifier 28 becomes lower than V27. Then, the DC level of pedestal pulse P29 (FIG. 2C), which is obtained by switching the potential of signal V28 by sampling pulse Pc (FIG. 2B), also decreases. The pedestal level of signals S21, S22, S16 and S24 goes down in correspondence with the DC level decrease of pulse P29. Potential V25 then goes down, and the operation of the feedback loop in the circuit of FIG. 1 stabilizes when potential V27 at node A is converged to 0 V. In contrast to this, when V27 becomes negative, even slightly, upon superposition of V25 onto Vp by circuit 27, the DC level of P29 (FIG. 2C) goes up and the pedestal level of S24 (FIG. 2F) accordingly goes up. As a result, V25 goes up, and node A potential V27 finally stabilizes at 0 V.

When the potential of pedestal control voltage Vp is assumed to be −E (negative) and the potential of V25 at which the feedback loop stabilizes is assumed to be +epl (positive), the feedback loop in FIG. 1 stabilizes (or balances) at:

$$epl/(R1 = -E/(R2+VR) \tag{1}$$

If R1=R2+VR, the stabilizing point is at epl=−E. In this case, the pedestal level of signal S24 (Sout) has the same magnitude as control voltage Vp.

In the pedestal control circuit shown in FIG. 1, if the feedback loop operates stably and the closed loop gain is sufficiently high, regardless of the changes of the characteristic of gamma corrector 16, the pedestal level of signal S24 automatically converges to a predetermined value corresponding to control voltage Vp. For instance, a case will be considered wherein the gamma correction characteristic of corrector 16 is changed from curve A to curve B in FIG. 3. In this case, when input signal S22A is corrected in accordance with curve A, output signal S16A having pedestal level eplA is obtained. With curve B, output signal S16X having pedestal level eplX is obtained. In other words, when curve A is changed to curve B, the pedestal level of the gamma-corrected output signal changes from eplA to eplX (corresponding to an increase in V25). However, since this change (increase) in pedestal level causes decrease in the level of pedestal pulse P29, the pedestal level of the input signal goes down from epA to eplB. Thus, the input signal changes from S22A to S22B. The gamma-corrected output signal for signal S22B in accordance with curve B becomes S16B, and variations in the pedestal level are cancelled (eplA=eplB). The pedestal level of signal S24 corresponding to signal S16 (=S16A or S16B) automatically converges to a predetermined value (epl in FIG. 2F) corresponding to eplA= eplB.

As described above, in the circuit shown in FIG. 1, even if the gamma correction characteristic is changed arbitrarily, the pedestal level of output signal Sout can be automatically set at a predetermined value corresponding to control voltage Vp. When red, green and blue pedestal controllers of the same circuit configuration as that in FIG. 1 are provided, the pedestal levels of R, G and B color signals can be uniformly and stably set at desired values by single pedestal control voltage Vp.

FIG. 4 shows a case wherein the circuit configuration shown in FIG. 1 is applied to the respective R, G and B color signal circuits, and the pedestal levels of the R, G and B signals are adjusted by a single control voltage (Vp). More specifically, R pedestal and gamma controller 100R is used for R signal input SinR. G pedestal and gamma controller 100G is used for G signal input SinG. B pedestal and gamma controller 100B is used for B signal input SinB. Referring to FIG. 4, the same reference symbols denote the same parts in FIG. 1 except that they have suffixes R, G and B. In FIG. 4, gamma correction of respective R, G and B color signals is independently performed by variable resistors 18R, 18G and 18B. However, pedestal control of the R, G and B color signals is performed simultaneously by single control voltage Vp. With such operation, even if different gamma correction characteristics are applied to R, G and B color signals, stable and variation-free pedestal control can be easily performed with single pedestal control voltage Vp.

FIG. 5 shows a circuit obtained by partially modifying the circuit shown in FIG. 1. In FIG. 5, first clamp circuit 22 is arranged in signal Sin input circuit of pulse mixer 21. The operation of the circuit shown in FIG. 5 is substantially the same as that in FIG. 1.

FIG. 6 shows a circuit obtained by modifying another part of the circuit shown in FIG. 1. The circuit shown in FIG. 6 has sample/hold circuit 25A for sampling signal S24 by sampling pulse Ps, and sample/hold circuit 25B for sampling signal S24 by control voltage Vcp. Output voltage V25 from S/H circuit 25A is supplied to the inverting input of operational amplifier 28 through pedestal adjustment circuit 27. The non-inverting input of amplifier 28 receives output voltage V25B from S/H circuit 25B. Voltage V25B corresponds to the bottom potential (normally 0 V) of signal S24 in the clamping period, as can be seen from FIGS. 2E and 2F.

When the circuit in FIG. 1 is modified as in FIG. 6, a negative feedback loop is obtained in which the potential of V27 follows that of V25B. Thus, signal S24 (Sout), which has a given fixed pedestal level corresponding to Vp, can be obtained by a feedback operation that achieves V27=V25B irrespective of the circuit ground potential of FIG. 1. The circuit shown in FIG. 6 is particularly advantageous when the circuit ground potential could vary unstably due to noise or the like.

FIG. 7 shows another practical modification of the circuit shown in FIG. 1. In FIG. 7, amplifier 28 serves as a conventional comparator. Reference potential Vref of comparator 28 is obtained by voltage division of control voltage Vp by variable resistor VR. With the circuit shown in FIG. 7, a feedback operation that achieves V25=Vref can be performed. The circuit shown in FIG. 7 operates in substantially the same manner as the circuit shown in FIG. 1.

FIG. 8 shows a circuit diagram of a signal generator for obtaining signals Pc, Vcp and Ps which are used in the circuits of FIGS. 1, 5, 6, and 7. FIGS. 9A to 9I show the signal waveforms at material parts of the circuit in FIG. 8.

Sync generator 70 generates vertical blanking pulse BL (FIG. 9A), vertical sync pulse VD (FIG. 9B), and horizontal sync pulse HD (FIG. 9C). Pulse HD is slightly delayed by delay circuit 71 and becomes clock pulse S71. Pulse S71 clocks modulo 12 counter 72. Counter 71 is cleared by pulse VD immediately before the clocking by pulse S71 starts. Count output S72 (FIG. 9D) is obtained from counter 72, by counting pulse S71. Switch pulse Pc (FIG. 9I) is obtained by NAND gate 77 which is responsive to the logical NAND of pulses HD and S72.

Vertical sync pulse VD is delayed by, e.g., 1H by monostable multivibrator (MMV) 75 and becomes delayed pulse S75 (FIG. 9G). Pedestal control voltage Vcp (FIG. 9H) is obtained by triggering MMV 76 by pulse S75. Output S72 is slightly delayed by MMV 73, and delayed pulse S73 (FIG. 9E) thus obtained is used to trigger MMV 74 so that sample pulse Ps (FIG. 9F) is obtained.

In order to support the content of this application, U.S. Pat. No. 4,506,287 (Mar. 19, 1985; Yamanaka et al.) is incorporated herein.

In summary, the present invention provides a pedestal control circuit in which the pedestal level can be free of the change of a gamma correction amount for color adjustment, and the pedestal control for a plurality of color signals can be achieved simultaneously.

While the invention has been described in connection with what is presently considered to be the most practical and preferred embodiment, it is understood that the invention is not to be limited to the disclosed embodiment but, on the contrary, is intended to cover various modifications and equivalent arrangements included within the scope of the appended claims which scope is to be accorded the broadest interpretation so as to encompass all such modifications and equivalent structures.

What is claimed is:

1. A pedestal control circuit comprising:
   pedestal mixing means for mixing a reference pedestal signal with an input video signal which has not been gamma-corrected, and for producing a mixed video signal;
   gamma correcting means for gamma correcting the mixed video signal in accordance with a predetermined variable gamma correction characteristic, and for producing a gamma-corrected output video signal;
   pedestal detecting means for detecting from the gamma-corrected output video signal a component corresponding to the reference pedestal signal, and for producing a pedestal detection signal; and
   pedestal feedback means, responsive to the pedestal detection signal and a predetermined pedestal control signal, for feeding the reference pedestal signal, having a magnitude corresponding to the pedestal detection signal, back to said pedestal mixing means so that the pedestal detection signal converges to a value corresponding to the predetermined pedestal control signal;
   wherein said gamma correcting means includes:
   a first clamp circuit for performing DC clamping of the mixed video signal from said pedestal mixing means in accordance with a predetermined clamping control signal, and for producing a first DC restored signal;
   a gamma correction circuit for performing gamma correction of the first DC restored signal in accordance with the predetermined variable gamma correction characteristic, and for producing a gamma-corrected signal; and
   a second clamp circuit for performing DC clamping of the gamma-corrected signal from said gamma correction circuit in accordance with the predetermined clamping control signal, and for producing a second DC restored signal corresponding to the gamma-corrected output video signal.

2. A pedestal control circuit according to claim 1, wherein said pedestal detecting means includes:
   a sample/hold circuit for sampling and holding a DC level of the output video signal, or sampling and holding a DC level of a signal corresponding the output video signal, in accordance with a sampling pulse which is generated after the predetermined clamping control signal disappears in a vertical blanking period of the input video signal, and for producing the pedestal detection signal.

3. A pedestal control circuit according to claim 2, wherein said pedestal feedback means includes:
   comparing means for comparing the pedestal detection signal with the pedestal control signal, and for producing a comparison output signal corresponding to a difference between the magnitudes of these signals; and
   switching means for performing, in accordance with a switching pulse having a predetermined period, signal switching between the level of the comparison output signal and a predetermined level, and for producing a reference pedestal signal having an amplitude corresponding to the level of the comparison output signal and a period corresponding to the period of the switching pulse, said switching pulse being generated in a period wherein the clamping control signal and the sampling pulse disappear.

4. A pedestal control circuit according to claim 1, wherein said pedestal detecting means includes:
   a first sample/hold circuit for sampling and holding a DC level of the output video signal, or sampling and holding a DC level of a signal corresponding the output video signal, in accordance with a sampling pulse generated after the predetermined clamping control signal disappears in a vertical blanking period of the input video signal, and for producing the pedestal detection signal; and
   a second sample/hold circuit for sampling and holding the DC level of the output video signal, or sampling and holding a DC level of a signal corresponding the output video signal, in accordance with the clamping control signal, and for producing a reference level which corresponds to the converged value of the pedestal detection signal obtained by the feedback of said pedestal feedback means.

5. A pedestal control circuit according to claim 4, wherein said pedestal feedback means includes:
   comparing means for comparing the pedestal detection signal with the pedestal control signal, and for producing a comparison output signal corresponding to a difference between the magnitude of these signals; and
   switching means for performing, in accordance with a switching pulse having a predetermined period, signal switching between the level of the comparison output signal and a predetermined level, and for producing a reference pedestal signal having an amplitude corresponding to the level of the comparison output signal and a period corresponding to the period of the switching pulse, said switching pulse being generated in a period wherein the clamping control signal and the sampling pulse disappear.

6. A pedestal control circuit comprising:
   pedestal mixing means for mixing a reference pedestal signal with an input video signal which has not been gamma-corrected, and for producing a mixed video signal;
   gamma correcting means for gamma correcting the mixed video signal in accordance with a predetermined variable gamma correction characteristic, and for producing a gamma-corrected output video signal;

pedestal detecting means for detecting from the gamma-corrected output video signal a component corresponding to the reference pedestal signal, and for producing a pedestal detection signal; and pedestal feedback means, responsive to the pedestal detection signal and a predetermined pedestal control signal, for feeding the reference pedestal signal, having a magnitude corresponding to the pedestal detection signal, back to said pedestal mixing means so that the pedestal detection signal converges to a value corresponding to the predetermined pedestal control signal;

wherein said gamma correcting means includes:

a first clamp circuit for performing DC clamping of the input video signal in accordance with a predetermined clamping control signal, producing a first DC restored signal, and supplying the first DC restored signal to said pedestal mixing means;

a gamma correction circuit for performing gamma correction of a mixed video signal from said pedestal mixing means, in accordance with the predetermined variable gamma correction characteristic, and for producing a gamma-corrected signal, said mixed video signal corresponding to the first DC restored signal; and a second clamp circuit for performing DC clamping of the gamma-corrected signal from said gamma correction circuit in accordance with the predetermined clamping control signal, and for producing a second DC restored signal corresponding to the output video signal.

7. A pedestal control circuit according to claim 6, wherein said pedestal detecting means includes:

a sample/hold circuit for sampling and holding a DC level of the output video signal, or sampling ahd holding a DC level of a signal corresponding the output video signal, in accordance with a sampling pulse which is generated after the predetermined clamping control signal disappears in a vertical blanking period of the input video, and for producing the pedestal detection signal.

8. A pedestal control circuit according to claim 7, wherein said pedestal feedback means includes:

comparing means for comparing the pedestal detection signal with the pedestal control signal, and for producing a comparison output signal corresponding to a difference between the magnitudes of these signals; and switching means for performing, in accordance with a switching pulse having a predetermined period, signal switching between the level of the comparison output signal and a predetermined level, and for producing a reference pedestal signal having an amplitude corresponding to the level of the comparison output signal and a period corresponding to the period of the switching pulse, said switching pulse being generated in a period wherein the clamping control signal and the sampling pulse disappear.

9. A pedestal control circuit according to claim 6, wherein said pedestal detecting means includes:

a first sample/hold circuit for sampling and holding a DC level of the output video signal, or sampling and holding a DC level of a signal corresponding the output video signal, in accordance with a sampling pulse generated after the predetermined clamping control signal disappears in a vertical blanking period of the input video signal, and for producing the pedestal detection signal; and a second sample/hold circuit for sampling and holding the DC level of the output video signal (Sout), or sampling and holding a DC level of a signal corresponding the output video signal, in accordance with the clamping control signal, and for producing a reference level which corresponds to the converged value of the pedestal detection signal obtained by the feedback of said pedestal feedback means.

10. A pedestal control circuit according to claim 9, wherein said pedestal feedback means includes:

comparing means for comparing the pedestal detection signal with the pedestal control signal, and for producing a comparison output signal corresponding to a difference between the magnitudes of these signals; and switching means for performing, in accordance with a switching pulse having a predetermined period, signal switching between the level of the comparison output signal and a predetermined level, and for producing a reference pedestal signal having an amplitude corresponding to the level of the comparison output signal and a period corresponding to the period of the switching pulse, said switching pulse being generated in a period wherein the clamping control signal and the sampling pulse disappear.

11. A pedestal control circuit comprising:

pedestal mixing means for mixing a reference pedestal signal with an input video signal which has not been gamma-corrected, and for producing a mixed video signal;

gamma correcting means for gamma correcting the mixed video signal in accordance with a predetermined variable gamma correction characteristic, and for producing a gamma-corrected output video signal;

pedestal detecting means for detecting from the gamma-corrected output video signal a component corresponding to the reference pedestal signal, and for producing a pedestal detection signal; and pedestal feedback means, responsive to the pedestal detection signal and a predetermined pedestal control signal, for feeding the reference pedestal signal, having a magnitude corresponding to the pedestal detection signal, back to said pedestal mixing means so that the pedestal detection signal converges to a value corresponding to the predetermined pedestal control signal;

wherein said pedestal feedback means includes:

comparing means for comparing the pedestal detection signal with the pedestal control signal, and for producing a comparison output signal corresponding to a difference between the magnitude of these signals; and switching means for performing, in accordance with a switching pulse having a predetermined period, signal switching between the level of the comparison output signal and a predetermined level, and for producing a reference pedestal signal having an amplitude corresponding to the level of the comparison output signal and a period corresponding to the period of the switching pulse.

* * * * *